(12) United States Patent
Koukes et al.

(10) Patent No.: US 7,912,663 B2
(45) Date of Patent: Mar. 22, 2011

(54) METHOD FOR IMPROVING AN INDIRECTLY MEASURING TIRE PRESSURE MONITORING SYSTEM

(75) Inventors: Vladimir Koukes, Darmstadt (DE); Martin Griesser, Eschborn (DE); Michel Wagner, Darmstadt (DE); Geoffrey Bauer, Oxford, MI (US)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 12/065,918

(22) PCT Filed: Aug. 31, 2006

(86) PCT No.: PCT/EP2006/065890
§ 371 (c)(1),
(2), (4) Date: Mar. 6, 2008

(87) PCT Pub. No.: WO2007/028766
PCT Pub. Date: Mar. 15, 2007

(65) Prior Publication Data
US 2008/0208502 A1    Aug. 28, 2008

(30) Foreign Application Priority Data

Sep. 9, 2005 (DE) .................. 10 2005 043 174
Aug. 31, 2006 (DE) .................. 10 2006 040 912

(51) Int. Cl.
*G01M 17/02* (2006.01)
*G01L 27/00* (2006.01)

(52) U.S. Cl. .................................. 702/98

(58) Field of Classification Search .......... 702/98, 702/69, 85, 140; 73/37, 146.2, 146.3; 340/442, 340/443
See application file for complete search history.

(56) References Cited

U.S. PATENT DOCUMENTS

| | | | | |
|---|---|---|---|---|
| 4,186,377 A * | 1/1980 | Barabino | | 340/446 |
| 5,583,483 A * | 12/1996 | Baumann | | 340/444 |
| 5,753,809 A * | 5/1998 | Ogusu et al. | | 73/146.2 |
| 6,061,642 A | 5/2000 | Nakajima | | |
| 6,285,280 B1 | 9/2001 | Wang | | |
| 6,323,765 B1 * | 11/2001 | Horie et al. | | 340/442 |
| 6,396,396 B2 | 5/2002 | Oshiro et al. | | |
| 6,439,045 B1 * | 8/2002 | Latarnik et al. | | 73/146.5 |
| 6,644,108 B2 | 11/2003 | Inoue | | |
| 6,826,462 B2 | 11/2004 | Griesser et al. | | |
| 2005/0057348 A1 * | 3/2005 | Hammerschmidt | | 340/445 |
| 2005/0080587 A1 * | 4/2005 | Giustino et al. | | 702/127 |
| 2006/0155505 A1 * | 7/2006 | Griesser et al. | | 702/138 |
| 2007/0013499 A1 * | 1/2007 | Hammerschmidt | | 340/442 |

FOREIGN PATENT DOCUMENTS

| | | |
|---|---|---|
| DE | 19926616 | 12/2000 |
| DE | 10058140 | 1/2002 |
| WO | 2005072995 | 8/2005 |

* cited by examiner

*Primary Examiner* — Cindy Hien-Dieu Khuu

(57) ABSTRACT

Disclosed is a method of improving the recognition of a tire pressure loss in a tire pressure monitoring system in which at least one reference value (A) is formed on the basis of signals representing the rotational speeds of several vehicle wheels. A pressure loss is concluded by comparing a currently determined reference value with at least one reference value if the currently determined reference value exceeds or falls short of a predefined value. A noise analysis of the reference value(s) (101) is executed and at least one threshold value (T, S) is adjusted (108) based on the result of the noise analysis (102).

9 Claims, 4 Drawing Sheets

METHOD FOR IMPROVING AN INDIRECTLY MEASURING TIRE PRESSURE MONITORING SYSTEM

CROSS-REFERENCE TO RELATED APPLICATIONS

This claims the benefit of German Patent Application Number 10 2005 043 174.7 filed Sep. 9, 2005 and German Patent Application Number 10 2006 040 912.4 filed Aug. 31, 2006. The disclosures of the above applications are incorporated herein by reference in their entirety.

BACKGROUND OF THE INVENTION

The present invention relates to a method for improving the recognition of a tire deflation in a tire pressure monitoring system in which at least one reference value (A) is generated on the basis of signals representing the wheel speeds of several vehicle wheels, in which case on the basis of the comparison of one currently determined reference value with at least one comparative value a pressure loss is inferred if the currently determined reference value exceeds respectively falls short of a predefined value. Furthermore, the invention relates to a computer program product defining an algorithm for the above method.

A reliable monitoring of the tire pressure on all wheels of a motor vehicle is very important for the safety of the motor vehicle. There are different approaches as to how tire pressure monitoring systems can be realized. There are so-called directly measuring tire pressure monitoring systems, as disclosed e.g. in the patent application DE 199 26 616 C2, detecting the respective pressure in the corresponding wheel by means of pressure sensors in the single wheels. Such systems monitor the tire pressure independently on all wheels. In addition, so-called indirectly measuring tire pressure monitoring systems are disclosed, e.g. in DE 100 58 140 A1 (DDS: Deflation Detection System), which are able to determine a pressure loss from auxiliary parameters, e.g. by comparing the information on the speed of the single wheels. Furthermore patent WO 2005/072995 A1 discloses a method of indirect tire pressure monitoring in which a known indirectly measuring tire pressure monitoring system (DDS) is improved taking into account the torsion natural frequency of the vehicle tires.

Indirectly measuring deflation detection methods on the basis of wheel speed information teach in so-called reference values serving essentially for crosswise comparison of the single wheels. In a four-wheel vehicle, for example, the consideration of three independent reference values has become an accepted standard. A first reference value describes the relation between two wheels on the same axle, a second reference value describes the relation between two wheels on the same vehicle side and a third reference value describes the relation between two wheels diagonally facing each other.

Furthermore, indirectly measuring tire pressure monitoring systems often use the information provided by systems already available in the motor vehicle, e.g. the wheel speed information of an anti-lock system (ABS), in order to draw conclusions regarding the tire pressures. This information has to be processed with statistical methods. In this case long processing time intervals may prevent the timely provision of the deflation detection system during the teach-in mode and/or when detecting pressure losses. Furthermore, the tire pressure monitoring systems are disabled if the quality of the input signals is insufficient, e.g. if the noise level of the signals is too high due to poor road conditions. In order to reduce teach-in and detection times and improve the availability of the system, it is necessary to adjust the system to the current road conditions.

Preferably, a method for indirectly detecting a pressure loss comprises a teach-in and a pressure monitoring phase. During the teach-in phase the comparative (reference) values are determined. During the pressure monitoring phase following the teach-in phase, currently determined reference values are compared with the values taught in, taking into account threshold values for the pressure loss detection.

It is the object of the invention to provide a method for adjusting a tire pressure monitoring system to the current road conditions which improves an indirectly measuring tire pressure monitoring system or a combined tire pressure monitoring system comprising an indirectly and a directly measuring tire pressure monitoring system.

SUMMARY OF THE INVENTION

The present invention achieves this object by a method for improving the recognition of a tire deflation in a tire pressure monitoring system in which at least one reference value (A) is generated on the basis of signals representing the wheel speeds of several vehicle wheels, in which case on the basis of the comparison of one currently determined reference value with at least one comparative value a pressure loss is inferred if the currently determined reference value exceeds respectively falls short of a predefined value. The method includes performing a noise analysis of the reference value(s) (101) and at least one threshold value (T, S) is adjusted (108) subject to the result of the noise analysis (102).

The invention is based on the idea of performing a noise analysis of the reference value respectively the reference values adjusting at least one threshold value subject to the result of the noise analysis.

According to the present invention, a noise analysis is defined as an analysis of the variation or range or dispersion of the values of one parameter. A simple form of noise analysis is preferably possible in that directly sequential values of a parameter are compared with each other, in particular the difference of two sequential values is considered. If this difference, e.g., exceeds a defined threshold value, a noise of the parameter is recognized.

Preferably at least one threshold value is adjusted if the noise analysis determines a noise of the reference value being longer than a given period of time.

In a preferred embodiment of the invention, the threshold value respectively threshold values being adjusted subject to the result of the noise analysis is/are a threshold value for noise recognition and/or a threshold value for determining a pressure loss. In an especially preferred manner, the threshold value respectively threshold values being adjusted subject to the result of the noise analysis is/are a threshold value/values for noise recognition.

Preferably the average of values of a reference value is determined, selecting the values considered for generating the mean value subject to the result of the noise analysis.

It is also preferred that instead of or additionally to the selection of the values considered for taking the mean value subject to the result of the noise analysis, an average of values of a reference value is provided, where the number of the values considered for generating the mean value is adjusted subject to the result of the noise analysis or the adjustment of the threshold value for noise detection and/or subject to a criterion for the dispersion of the values. The criterion for the dispersion of the values corresponds in an especially preferred manner to the standard deviation of the values.

In another preferred embodiment at least one threshold value is used for detecting a pressure loss which is adjusted subject to a criterion for the dispersion of the values of a reference value. In an especially preferred manner, also in this case the standard deviation of the values is the criterion for the dispersion of the values.

In a further development of the present invention the dependence of a reference value upon a driving parameter is achieved by determining the parameters of a functional correlation. Here the driving parameter corresponds, in an especially preferred manner, to the vehicle speed or the wheel torque. In an especially preferred manner, a linear correlation is assumed for the functional correlation. Thus the two parameters of the functional correlation to be determined, i.e. slope and "offset", are the reference value if the value of the driving parameter is zero.

For determining the parameter of the functional correlation, preferably single values of the reference values or mean values of the reference value are used. If the dependence of the reference value upon the driving parameter is considerable, it is advantageous to determine the parameter of the functional correlation by adjusting single values of the reference value.

Preferably the parameters of the functional correlation are determined as soon as a new pair of values is determined from driving parameter and reference value. Thus the method is able to determine the parameters of the correlation with only two value pairs, proceeding on the assumption of a linear correlation. With every newly added value pair the parameters are redefined thus increasing the precision or reliability of the determined parameters.

In a preferred embodiment, the parameters of the functional correlation are used for recognizing a pressure loss. In an especially preferred manner the parameters determined during the teach-in phase of the system are used for detecting the pressure loss. Using the parameters of the functional correlation for the detection of a pressure loss is especially advantageous if the reference value depends to a great extent on the driving parameter and if the parameters were determined by adjusting single values of the reference value. If the reference value depends on the driving parameter only to a minor degree, the averaged reference value is preferably compared directly with the corresponding taught-in mean value and used for detecting the pressure loss.

In a further embodiment of the invention the noise analysis and/or the determination of the parameters of the functional correlation is/are carried out during the teach-in phase of the system in which the comparative values are determined and/or during the pressure monitoring phase.

It is an advantage of the method according to the present invention that the tendency of an indirectly measuring or combined tire pressure monitoring system to generate a faulty warning is reduced. Thus it is possible to get a more reliable detection of the tire deflation. Not only does the ruggedness of the tire pressure monitoring system increase, but also the availability of the system in case of bad road conditions. Thus, the time intervals for the teach-in/detection are reduced.

The method according to the present invention can be realized in an indirectly measuring tire pressure monitoring system based exclusively on the evaluation of the roll circumferences of the tires, or also in an indirectly measuring tire pressure monitoring system which not only evaluates the roll circumferences but also carries out a frequency analysis of the tire vibrations. It is also possible to carry out the method according to the present invention in a combined tire pressure monitoring system in which an indirectly measuring tire pressure monitoring system is combined with a directly measuring tire pressure monitoring system.

The invention relates also to a computer program product defining an algorithm according to the method described above.

Further preferred embodiments of the invention result from the following description on the basis of figures.

DETAILED DESCRIPTION OF THE DRAWINGS

Figure 1:
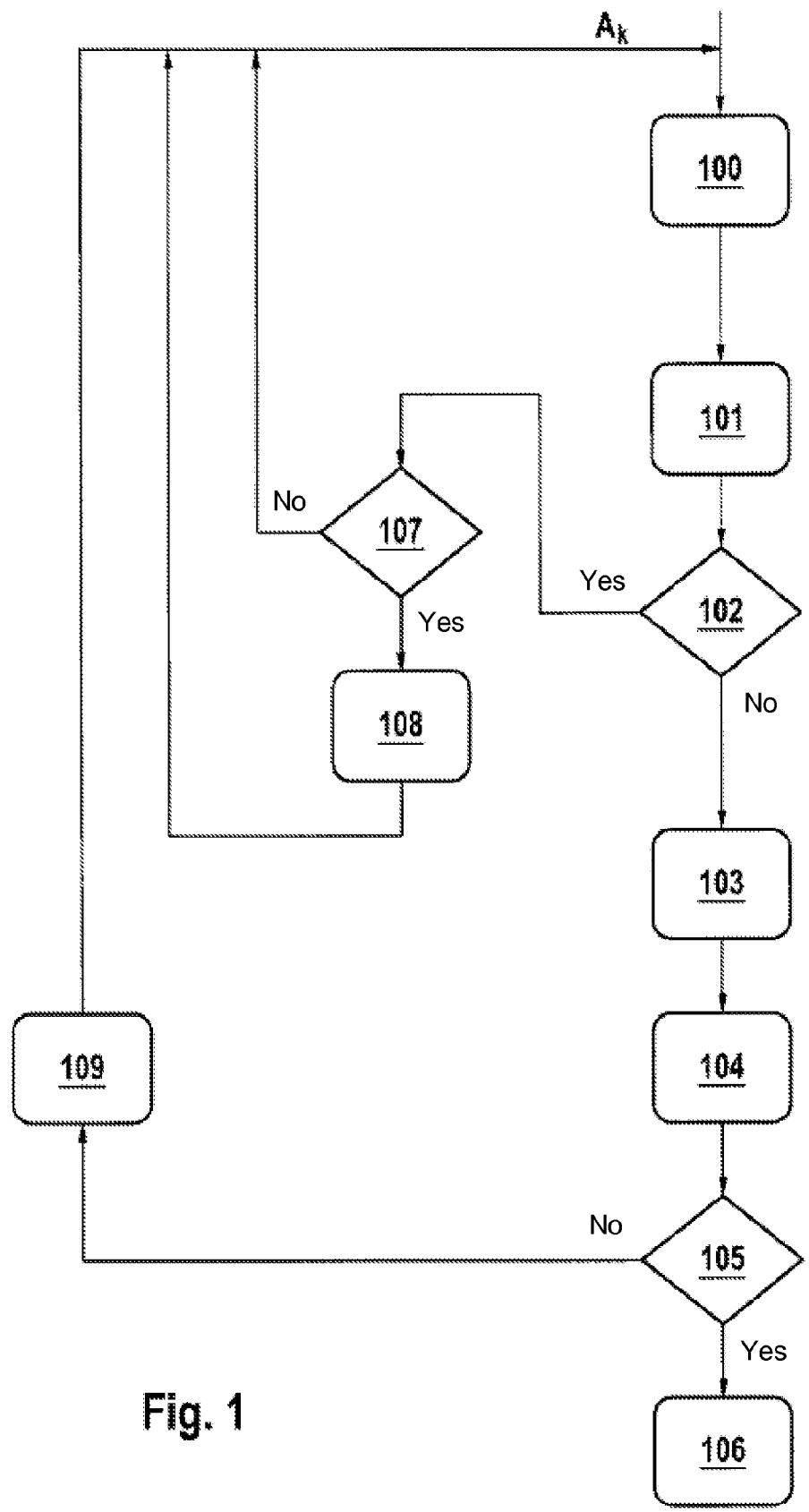
FIG. 1 is a schematical representation of the sequence of a method according to the invention.

FIG. 1 schematically represents the sequence of a method according to the present invention with regard to an adaptive indirectly measuring tire pressure monitoring system. According to the example, a reference value A is used for the pressure monitoring. As soon as a new value $A_k$ is given for reference value A, it will be read in (block 100). The noise analysis 101 checks whether the noise level of the reference value A is not too high. Therefore each new value $A_k$ is compared with the previous value $A_{k-1}$. To this end the difference $|A_k-A_{k-1}|$ is compared with a given threshold value T for noise recognition ($|A_k-A_{k-1}|>T$ ?, block 102). If $|A_k-A_{k-1}|$ exceeds the threshold value T, a flag "noise" is set, i.e. the noise level of the reference value A is considered as being too high. If it is determined that the noise level of A is too high (noise=1), $A_k$ is not used for teaching-in or monitoring the tire pressure any longer. The system waits until a new value $A_{k+1}$ is given.

Up to now, a fixed threshold value T was used for noise analysis 101, 102. In some cases, however, this leads to a complete long-term switch-off/failure of the tire pressure monitoring system. For example, the tire pressure monitoring system does not function on pebble stone roads. Here the amounts $|A_k-A_{k-1}|$ are always significant. On the other hand the signal of the reference value A is not characterized by single bounces, but by continuous and substantial deviations.

In order to avoid a long-term deactivation of the tire pressure monitoring system, the threshold value T for noise control is adjusted to the road condition (block 108), as described in the example. Therefore it is first verified whether the noise of the reference value A has already continued for some time (block 107). If the value of flag "noise" has been 1 for a longer period of time, the threshold value T is gradually increased by a value $\Delta T$ (block 108, see also FIG. 2). At a certain point of time, the threshold value T has such an amount that the value $|A_k-A_{k-1}|$ is smaller than threshold value T, e.g. the variations of the reference value A will not be interpreted as noise anymore. The values $A_k$ will then be reused ("no"-branching in block 102).

If the variations of A are below the current threshold value T, e.g. no noise is detected (noise=0), the new value $A_k$ is used for calculating a mean value Â for reference value A (block 103) and a quality criterion for the dispersion of the reference value A (block 104), in particular a standard deviation σ(Â). Up to now, a fixed number N of values $A_k$ was used for calculating the mean value Â. Subsequently, the significance of the calculation results is examined (block 105). If the dispersion of reference value A is small enough, e.g. if the standard deviation σ(Â) is smaller than a given threshold value D, the result of the calculation, especially the mean value Â, is used for teaching in or for detecting a pressure loss (block 106).

The basic blocks of the process are:
noise analysis (blocks 101 and 102),
calculation of a mean value A of the reference value A (filtering) (block 103),
calculation of a standard deviation σ(Â) (block 104), and
verification of the significance of the result (block 105).

These blocks are carried out during the teach-in phase of the system as well as during the pressure monitoring respectively the detection of a pressure loss in case the teach-in phase of the system has already been concluded.

The teach-in of the system has to be carried out before the tire pressure monitoring system is ready. During the teach-in mode a mean value $Â_0$ of the reference value A is determined when driving without pressure loss. This value $Â_0$ is then used as comparative value for detecting a pressure loss. When during pressure monitoring it is determined that the current mean value Â of the reference value A during the teach-in mode differs by more than a threshold value S from the mean value $Â_0$, e.g. if $|Â_0-Â| \geq S$, a warning is emitted (e.g. "pressure loss occurring").

Increasing the threshold value T during noise control (block 108) may impair the precision of the determined mean value Â respectively the dispersion of the reference value A will increase due to this. Therefore, the threshold value S for triggering the warning ("pressure loss occurring") is also increased subject to the noise analysis or also subject to the dispersion of reference value A (block 108 or 104).

Another possibility of improving the detection of a tire pressure loss consists in adjusting the number N of the single values $A_k$ used for generating the mean value according to the current conditions (block 109). This can be done in teach-in mode and also during pressure monitoring. The number N of the values $A_k$ for generating the mean value is increased with the method according to the present invention (block 109) until the results become significant ("yes" branching in block 105) and the confidence range for the mean value Â (respectively $Â_0$) becomes small enough. The mean value $Â_0$ respectively Â is then used for teach-in respectively detecting the pressure loss (block 106).

The procedure of adjusting the number N of the values $A_k$ considered in the generation of the mean value can also be used if the flag "noise" has not been set for a longer period of time (mostly noise=0, only occasionally noise=1) and the threshold T has not been changed, but the dispersion of the reference value A is too wide.

Figure 2:
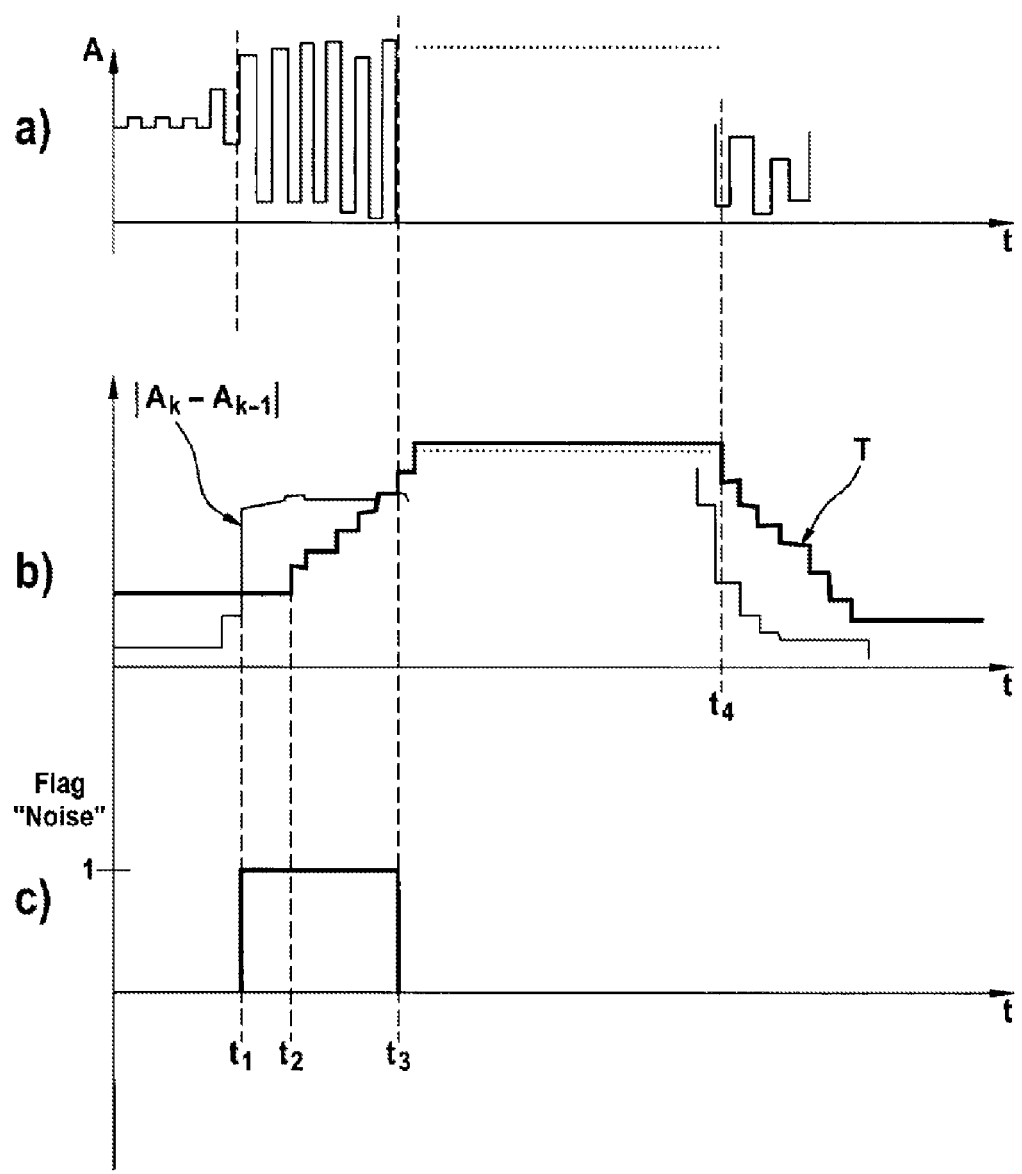
FIG. 2 is a schematical representation of the chronological process of adjusting a threshold value for noise recognition.
Figure 3:
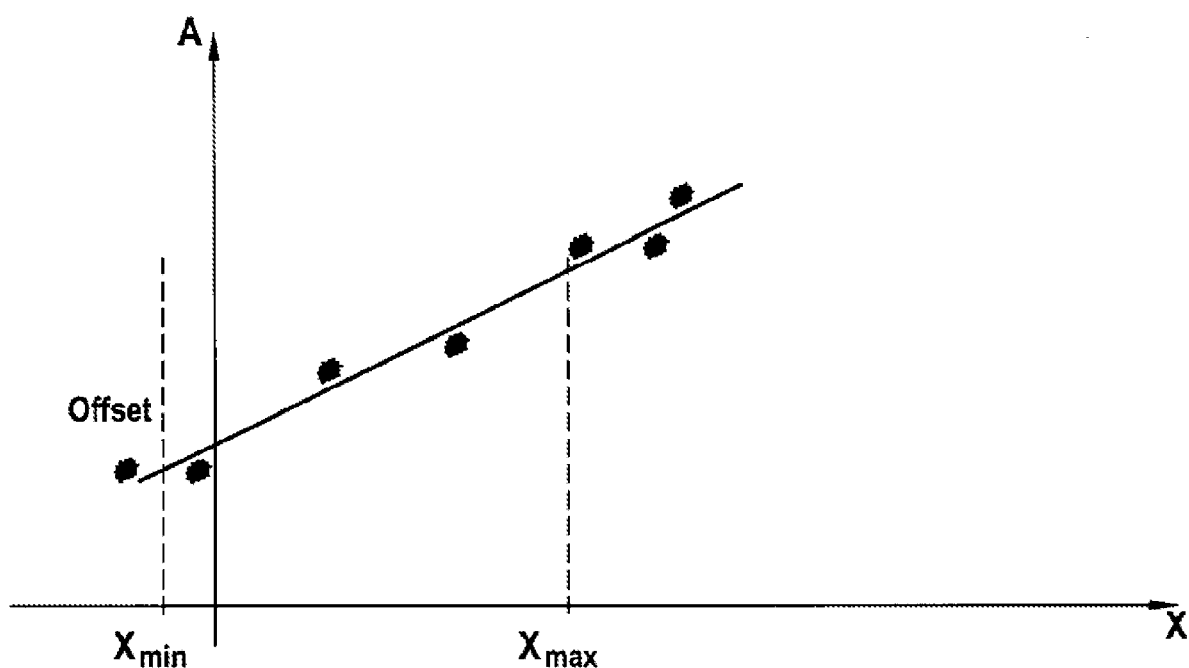
FIG. 3 is a correlation between a reference value and a driving parameter.

FIG. 2 schematically shows the chronological process of adjusting a threshold during noise analysis according to the present example. FIG. 2 shows the values $A_k$ of reference value A as a function of the time t, FIG. 2b shows the amount of the difference $|A_k-A_{k-1}|$ as well as the threshold value T and FIG. 3 shows the development of the flag "noise". Up to point of time $t_1$, reference value A varies only to a small degree and the amount $|A_k-A_{k-1}|$ remains below threshold value T. From $t_1$ onward reference value A shows a constant, loud noise. The amount $|A_k-A_{k-1}|$ exceeds threshold value T and therefore flag "noise" is set to 1. Since the noise continues, the threshold value T is gradually increased from point of time $t_2$. From point of time $t_3$ the amount $|A_k-A_{k-1}|$ is again below the current threshold value T and flag "noise" is set back to 0. Shortly after that also threshold value T is not increased further. If the noise level of reference value A is low again, also threshold value T is reduced again (from point of time $t_4$).

The reference value A may depend on the vehicle speed, the wheel torque or other values. A characteristic driving parameter is named X here. In this case another method for improving the pressure loss detection may be used after the noise analysis described above. The dependence of reference value A upon the driving parameter X (mathematically described by a function A(X)) can be approximated with a straight line within a limited interval of values X between $X_{min}$ and $X_{max}$. This is represented graphically in FIG. 3. In the interval the following applies:

$$A = \text{Offset} + \text{Slope} * X \qquad (1)$$

where Slope corresponds to the slope of the straight line and Offset to the value of the reference value A if the value of the driving parameter is zero (X=0). The straight line is defined according to equation (1), if Offset and Slope are known. These parameters can be found by means of the Least Squares Method (LS).

Figure 4:
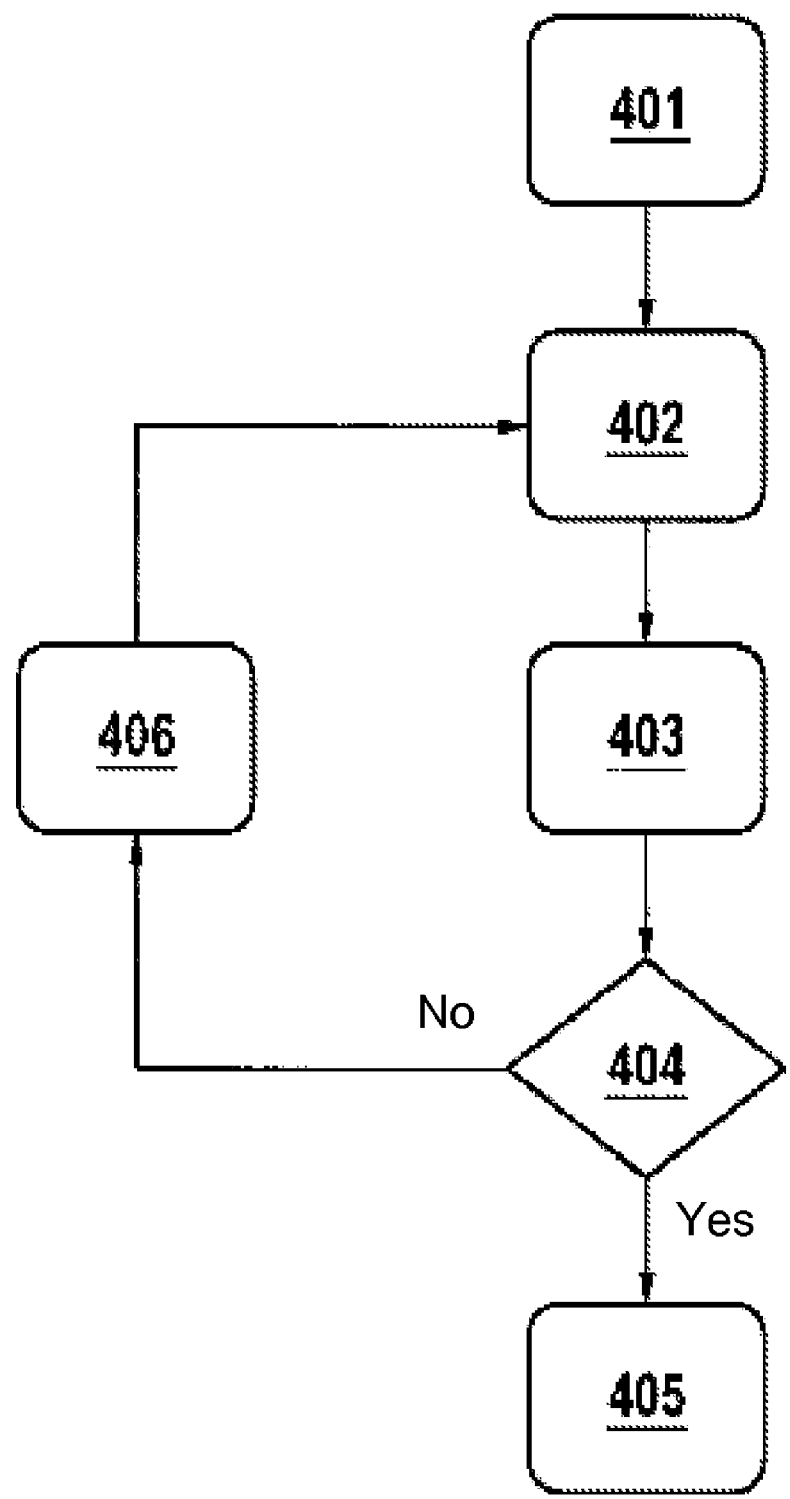
FIG. 4 is a schematical representation of the sequence of a method according to the invention for determining the parameters of a linear correlation between a reference value and a driving parameter.

FIG. 4 schematically represents the method according to the present invention for determining the parameters Offset and Slope. Single values $A_k$ or the mean reference value Â (respectively $Â_0$) can be used as input value A(X). First a new value pair is read in, comprising the driving parameter $X_n$ and the corresponding input value $A_n(X_n)$ (block 401). The parameters Offset and Slope are calculated recursively. As soon as there are two or more value pairs $X_n$ and $A_n(X_n)$, a fitting procedure may be carried out thus allowing to determine the parameters Offset and Slope (block 402). After the calculation, the quality respectively significance of the results is analyzed (block 403) and it is checked whether it is sufficient (block 404). For example, it may be checked whether the number of the used value pairs is sufficient for the Least Squares Method (LS), whether the correlation between A and X approaches to the amount of one, whether the values $X_n$ are distributed equally in the interval $[X_{min}, X_{max}]$ and/or other things. If the quality respectively significance is sufficient, the calculated values of the parameters Offset and Slope are used for teach-in or pressure monitoring (block 405). As long as the quality respectively significance of the results is not sufficient, Slope and Offset are calculated for each newly added value $X_n$ and the corresponding value $A_n(X_n)$ until the quality respectively the significance of the results is sufficient. In this case, for each new calculation the results of the calculation of the previous step, i.e. the results for $X_{n-1}$ and $A_{n-1}(X_{n-1})$ are used again (block 406).

During the teach-in phase, the significant values for Offset and Slope are stored as $\text{Offset}_0$ and $\text{Slope}_0$. During the pressure monitoring the stored values $\text{Offset}_0$ and $\text{Slope}_0$ are compared with the current significant values for Offset and Slope and the corresponding difference ΔOffset und ΔSlope is calculated according to the equations (2) and (3):

$$\Delta\text{Offset} = \text{Offset}_0 - \text{Offset} \qquad (2)$$

$$\Delta\text{Slope} = \text{Slope}_0 - \text{Slope} \qquad (3)$$

If the differences ΔOffset and ΔSlope of the values exceed the threshold values, a pressure loss is detected. A pressure loss is determined, if e.g. for the parameter Offset applies that the amount of ΔOffset exceeds a corresponding threshold value W, i.e. if |ΔOffset|>W, a warning (e.g. "pressure loss occurring") is emitted.

Another possibility involves that the reference value A (either each single value $A_k$ or a mean reference value $\hat{A}$) is compensated by means of the straight line taught in. This may be carried out according to the equation (4):

$$A_{comp} = A - \text{Offset}_0 - \text{Slope}_0 * X \qquad (4)$$

If it is determined that the current amounts $|A_{comp}|$ exceed a threshold value and this determination is significant, the system triggers a warning.

The fitting procedure with single reference values $A_k$ as input values $A(X)$ and the use of the parameters Offset and Slope for detecting a pressure loss is especially advantageous if reference value A depends to a high degree upon driving parameter X. If the degree of dependence is low, also the mean reference value $\hat{A}$ can be compared directly with the corresponding mean value $\hat{A}_0$ taught in and used for determining a pressure loss.

REFERENCE NUMERALS

100 Get new reference value $A_k$
101 Noise analysis
102 Noise?
103 Filter (calculation of a mean value $\hat{A}$)
104 Significance analysis (calculation of a standard deviation $\sigma(\hat{A})$); if necessary adjustment of a threshold value S for pressure determination
105 Are the results significant?
106 Used for teach-in or pressure monitoring
107 Continuous noise?
108 Adjustment of threshold values
109 Adjustment of the filter constants/parameters (adjustment of number N of the values in case of mean value generation)
401 Get new value pair $X_n$ and $A_n(X_n)$
402 Calculation of the new parameters Offset and Slope (LS)
403 Significance analysis
404 Are the results significant?
405 Use of the parameters Offset and Slope for teach-in or pressure monitoring/detection
406 Use of the results for the next calculation

The invention claimed is:

1. A non-transitory computer readable medium containing computer instructions stored therein for causing a computer processor to perform the method of operating a tire pressure monitoring system, comprising:
   generating a sequence of reference values(A) based on signals representing wheel speeds of several vehicle wheels;
   comparing one currently determined reference value with at least one comparative value;
   inferring a pressure loss if the currently determined reference value falls within a predetermined range based on a threshold value;
   performing a noise analysis on the reference values (101); and
   increasing the threshold value in response to the noise analysis showing that noise of the reference values exceeds the threshold value for a predetermined amount of time ($t_2$-$t_1$).

2. The non-transitory computer readable medium of claim 1, wherein the threshold value adjusted is a threshold value (T) for noise recognition or a threshold value (S) for detecting a pressure loss.

3. The non-transitory computer readable medium of claim 1, wherein the values ($A_k$) of a reference value are averaged (103), wherein the values ($A_k$) considered for forming the mean value are selected subject to the result of the noise analysis (102) or an adjustment of the number (N) of the values ($A_k$) considered for generating a mean value is carried out subject to the result of the noise analysis (102) or the adjustment (108) of the threshold value (T) for noise detection or subject to a standard deviation of the dispersion (104) of the values ($A_k$).

4. The non-transitory computer readable medium of claim 1, wherein at least one threshold value (S) is used for determining the pressure loss, which is adjusted subject to a standard deviation for the dispersion (104) of the values ($A_k$) of a reference value.

5. The non-transitory computer readable medium of claim 1, wherein a dependence of a reference value (A) upon a driving parameter (X) is achieved by determining the parameters (Slope, Offset) of a linear correlation.

6. The non-transitory computer readable medium of claim 5, wherein single values ($A_k$) or mean values ($\hat{A}$) of the reference value (A) are used for determining parameters (Slope, Offset) of a functional correlation.

7. The non-transitory computer readable medium of claim 6, wherein the parameters (Slope, Offset) of the functional correlation are determined after a new value pair is determined on the basis of the driving parameter ($X_n$) and reference value ($A_n(X_n)$).

8. The non-transitory computer readable medium of claim 7, wherein the parameters (Slope, Offset) of the functional correlation are used for determining a pressure loss.

9. The non-transitory computer readable medium of claim 1, wherein at least one of the noise analysis and the determination of the parameters of the functional correlation is carried out during the teach-in phase of the system in which the comparative values are determined, or during the pressure monitoring phase.

* * * * *